US008520217B2

(12) United States Patent
Naoi et al.

(10) Patent No.: US 8,520,217 B2
(45) Date of Patent: Aug. 27, 2013

(54) TALBOT INTERFEROMETER, ITS ADJUSTMENT METHOD, AND MEASUREMENT METHOD

(75) Inventors: Toshiyuki Naoi, Utsunomiya (JP); Seima Kato, Utsunomiya (JP); Naoki Kohara, Utsunomiya (JP); Chidane Ouchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 363 days.

(21) Appl. No.: 12/765,037

(22) Filed: Apr. 22, 2010

(65) Prior Publication Data

US 2010/0271636 A1 Oct. 28, 2010

(30) Foreign Application Priority Data

Apr. 22, 2009 (JP) ................................ 2009-103777

(51) Int. Cl.
*G01B 11/02* (2006.01)
*G01B 9/02* (2006.01)

(52) U.S. Cl.
USPC .......................................... 356/515; 356/521

(58) Field of Classification Search
USPC ................................. 356/499, 512–515, 521
See application file for complete search history.

(56) References Cited

U.S. PATENT DOCUMENTS 7,956,987 B2 * 6/2011 Ohsaki ........................... 355/71
2006/0262323 A1 * 11/2006 Yamamoto .................... 356/515

FOREIGN PATENT DOCUMENTS

JP 58045526 A * 3/1983
JP 2009250909 A * 10/2009

OTHER PUBLICATIONS

Nakano, Yoshiaki et al. "Talbot interferometry for measuring the focal length of a lens". Applied Optics, vol. 24, No. 19, Oct. 1, 1985, pp. 3162-3166.*

Takeda, Mitsuo et al. "Lateral aberration measurements with a digital Talbot interferometer", Applied Optics, vol. 23, No. 11, Jun. 1984, pp. 1760-1764.

* cited by examiner

*Primary Examiner* — Michael A Lyons
(74) *Attorney, Agent, or Firm* — Rossi, Kimms & McDowell LLP

(57) ABSTRACT

A Talbot interferometer includes a diffraction grating, an image pickup device, a moving unit configured to move at least one of the diffraction grating and the image pickup device in an optical axis direction of the test object, and a computer configured to adjust a position of the at least one of the diffraction grating and the image pickup device using the moving unit so that a Talbot condition can be met, based on a spatial frequency spectrum obtained from a plurality of interference fringes captured by the image pickup device while moving the at least one of the diffraction grating and the image pickup device using the moving unit.

2 Claims, 6 Drawing Sheets

TEST OBJECT L
2
3
6
1
4
5
2a
OPTICAL AXIS OA
7
8

TALBOT INTERFEROMETER, ITS ADJUSTMENT METHOD, AND MEASUREMENT METHOD

BACKGROUND OF THE INVENTION

1. Field of the Invention

The present invention relates to a Talbot interferometer, its adjustment method, and a measurement method.

2. Description of the Related Art

A Talbot interferometer can be used to measure a (transmission or reflection) wavefront of light that has passed a test object (a test optical system or a test optical element). Mitsuo Takeda et al., "Lateral Aberration Measurement Using A Digital Talbot Interferometer," United States, Applied Optics, vol. 23, no. 11, pp. 1760-1764 (1984). For improved measurement accuracy, an arrangement of the diffraction grating and the image pickup device needs to satisfy a condition referred to as a Talbot condition.

Although the diffraction grating and the image pickup device are arranged at design positions in the conventional Talbot interferometer, the design positions can shift from the Talbot condition due to alignment errors, and the measured wavefront contains an error.

SUMMARY OF THE INVENTION

The present invention provides a Talbot interferometer that can provide a highly precise measurement, an adjustment method of the Talbot interferometer, and a measurement method.

A Talbot interferometer according to one aspect of the present invention is configured to measure a wavefront of light that has passed a test object. The Talbot interferometer includes a diffraction grating configured to divide the light that has passed the test object into a plurality of diffracted light fluxes, an image pickup device configured to capture an interference fringe formed by the plurality of diffracted light fluxes, a moving unit configured to move at least one of the diffraction grating and the image pickup device in an optical axis direction of the test object, and a computer configured to adjust a position of the at least one of the diffraction grating and the image pickup device using the moving unit so that a Talbot condition can be met, based on a spatial frequency spectrum obtained from a plurality of interference fringes captured by the image pickup device while moving the at least one of the diffraction grating and the image pickup device using the moving unit.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
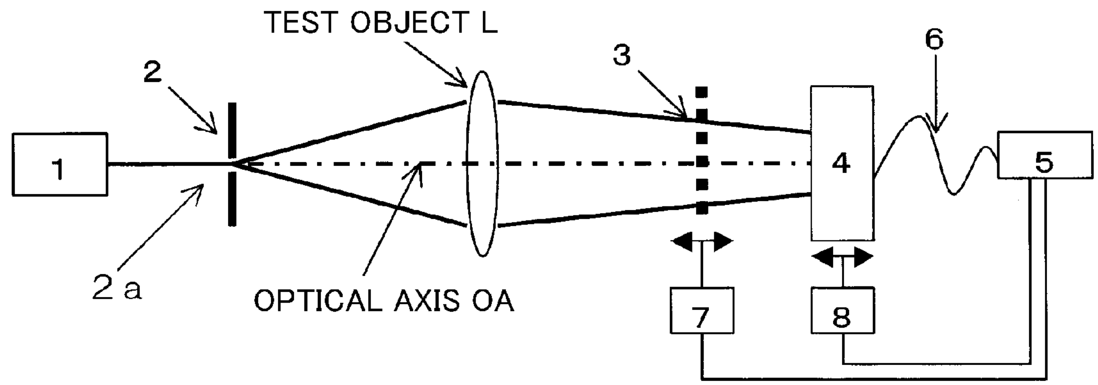
FIG. 1 is an optical path diagram of a Talbot interferometer according to a first embodiment.

FIG. 1 is an optical path diagram of a Talbot interferometer according to the first embodiment, which is configured to measure a (transparent or reflection) wavefront of light that has passed a test object L. The Talbot interferometer is configured to irradiate light having a known aberration to the test object L, to superimpose this known aberration on an aberration of the test object L, to divide a wavefront using a diffraction grating 3 behind the test object L, and to restore an image of the diffraction grating shape as an interference fringe obtained by superimposing the divided wavefronts. The Talbot interferometer of this embodiment includes, along an optical path, a light source 1, an illumination optical system 2, a test object L, a diffraction grating 3, an image pickup device 4, a computer 5, and moving units 7 and 8.

The light source 1 includes, for example, a laser, and irradiates coherent light. The test object L is a test optical system, a test optical element or a pre-worked glass material. The test optical system may use a dioptric optical system, a catadioptric optical system, or a catoptric optical system. The test optical element may use a lens, a mirror, or a diffraction optical element. The test object L of this embodiment is a lens.

The illumination optical system 2 converts a light wave from the light source 1 into a wavefront having a known aberration, and includes a pinhole plate having a pinhole 2*a* having a sufficiently small aperture and configured to generate a wavefront approximated to a spherical wave.

The diffraction grating 3 divides a wavefront that has transmitted the test object L, and divides the light that has passed the test object L into a plurality of diffracted light fluxes. The diffraction grating 3 of this embodiment is an orthogonal diffraction grating having periods in two orthogonal directions, and configured to divide the wavefront that has transmitted the test object L into two orthogonal directions. Thereby, wavefront gradients in the two orthogonal directions can be simultaneously measured. Changing of the grating period in accordance with an aberration amount of the test object L can vary a lateral shift amount of the wavefront divided by the diffraction grating 3 and adjust a dynamic range and a resolution of the measured aberration. The diffraction grating 3 that arranges transmission parts and light shield parts at regular intervals can cancel diffracted light fluxes of even orders which would otherwise become noises. The diffraction grating 3 is configured movable along the optical axis OA through the moving unit 7.

The image pickup device 4 of this embodiment is a two-dimensional image pickup device configured to image an interference fringe (formed by a plurality of diffracted light fluxes or) obtained by superimposing a plurality of wavefronts divided by the diffraction grating 3, and may use a CCD. The image pickup device is configured movable along an optical axis OA through the moving unit 8.

The computer 5 is connected to the image pickup device 4 via a cable 6, and includes a memory (not shown), a controller, an operating unit, and a display.

The controller controls operations of the moving units 7 and 8 based on information stored in the memory. The moving units 7 and 8 include, but are not limited to, motors (not shown) driven by the controller of the computer 5 and rails along the optical axis OA. The memory stores an interference fringe captured by the image pickup device 4. The display displays the interference fringe captured by the image pickup device 4.

The operating unit performs a Fourier transformation for the interference fringe stored in the memory, obtains the spatial frequency spectrum, and calculates an amplitude value and a phase value of each order spectrum which is a frequency component multiple of a fundamental frequency (or a frequency of a restored diffraction grating image) by a natural number. In addition, the operating unit determines a position or positions of the diffraction grating 3 and/or the image pickup device 4 based on changes of the amplitude value and the phase value of each order component in the spatial frequency spectrum. Moreover, the operating unit calculates a wavefront of the light that has passed the test object L from the interference fringe captured by the image pickup device 4.

In operation, the diffraction grating 3 and the image pickup device 4 are usually positioned so that the following Talbot condition can be met, the image pickup device 4 captures the interference fringe, the wavefront is analyzed and calculated, and the result is displayed.

The interference fringe $|u(x, y, z)|^2$ captured by the image pickup device 4 can be expressed as follows, where "z" is a distance between the diffraction grating 3 and an image pickup device 4 in the optical axis direction, "z0" is a distance between the diffraction grating 3 and the image plane of the test object L, "λ" is a wavelength of the interference light (or light from the light source 1), "d" is a period of the diffraction grating 3, "m" and "n" are orders of the diffracted light fluxes, and "W" is a wavefront aberration:

EQUATION 1

$$|u(x, y; z)|^2 = \sum_{n=-\infty}^{\infty} \sum_{m=-\infty}^{\infty} A_n A_m^* \exp\left(2\pi i\left\{\left(\frac{z_0}{z_0 - z}\right)\left(\frac{n-m}{d}\right)\left[x - \left(\frac{z}{z_0}\right)(z_0 - z)\left(\frac{\partial w}{\partial x}\right)\right] - \left(\frac{z_0 z}{z_0 - z}\right)\frac{(n^2 - m^2)\lambda}{2d^2} + \frac{\lambda}{2}\left(\frac{z}{d}\right)^2 (n^2 - m^2)\frac{\partial^2 w}{\partial x^2}\right\}\right)$$

The second and third phase terms in exponent of the Equation 1 are components that change the contrast of the interference fringe, and a drop of the contrast is a factor of a measurement error of a wavefront aberration. The third term is a component that always exists and depends upon the wavefront. The second term is a periodically variable component that depends upon z or z0, and becomes 0 by properly selecting z and z0 so that "N" in Equation 2 can become an integer, thereby providing an interference fringe having good contrast whose light intensity distribution is restored just after the diffraction grating.

Therefore, for highly precise measurements, it is important to position the diffraction grating 3 and the image pickup device 4 so that N in the Equation 2 can become an integer. A condition that makes N in the Equation 2 an integer will be referred to as a Talbot condition.

EQUATION 2

$$\left(\frac{z_0 z}{z_0 - z}\right) \cdot \left(\frac{\lambda}{2d^2}\right) = N$$

A Talbot interferometer that makes the diffracted light fluxes whose order difference is an odd number, such as interferences between the 0-th order light flux and the $\pm 1^{st}$ order diffracted light fluxes, interfere with each other provides an interference fringe having a good contrast when N in the Equation 2 is not only an integer but also a half integer. Assume a combination of different integers n and m as interference components in the interference fringe expressed in the Equation 1 where an order difference n−m is an odd number. Then, the second phase term $n^2-m^2$ always becomes an odd number, and a contribution of this term becomes −1 for all combinations of n and m when N is a half number. Hence, the interference fringe obtained when N is a half integer is an interference fringe obtained when N is an integer (or the light intensity distribution just after the diffraction grating) is shifted by half a grating period. Therefore, the Talbot condition is met where N in the Equation 2 is a half integer.

This embodiment provides an adjustment method for positioning the diffraction grating 3 and the image pickup device 4 so that the Talbot condition can be met based on the spatial frequency spectrum that is obtained by performing a Fourier transformation for the interference fringe.

Figure 2:
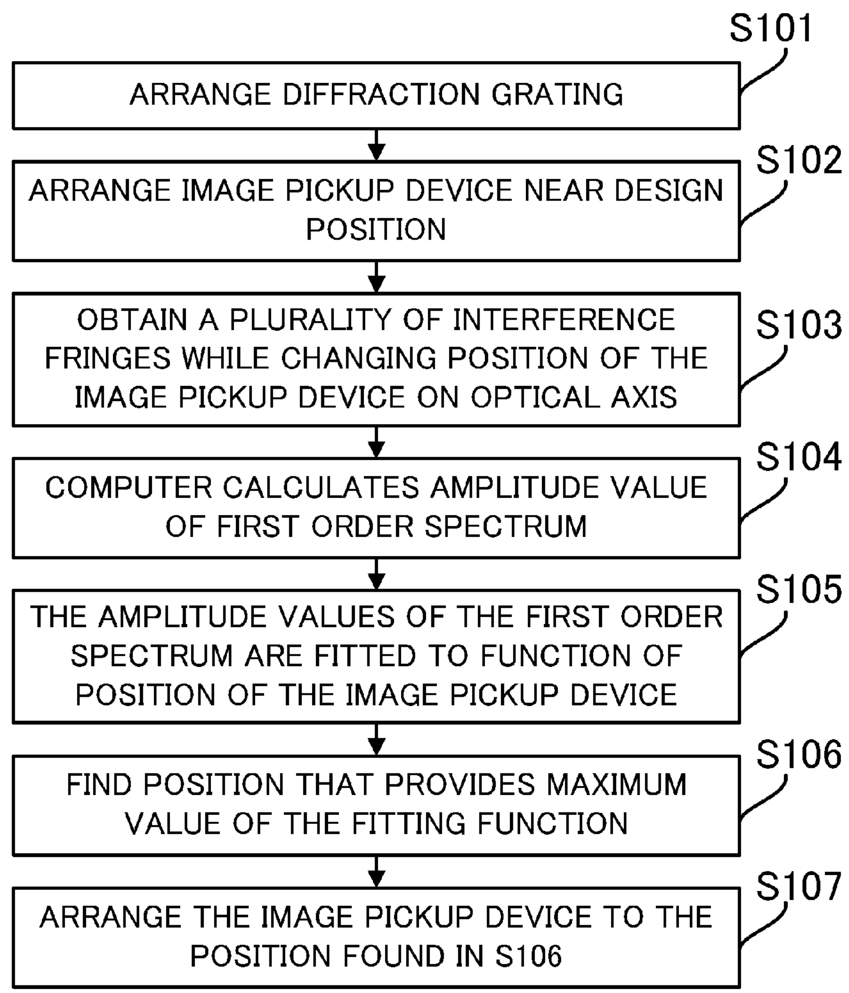
FIG. 2 is a flowchart of an adjustment method of the Talbot interferometer shown in FIG. 1.

FIG. 2 is a flowchart of an adjustment method of a Talbot interferometer according to the first embodiment, where "S" is an abbreviation of a step, similar to other figures.

Initially, the controller of the computer 5 arranges the diffraction grating 3 on the optical axis OA using the moving unit 7 (S101). Next, the controller of the computer 5 moves the image pickup device 4 on the optical axis OA using the moving unit 8 (S102). At this time, the image pickup device 4 is arranged so as to approximately satisfy the Talbot condition. Next, the controller of the computer 5 changes the position of the image pickup device 4 on the optical axis using the moving unit 8, and captures a plurality of interference fringes using the image pickup device 4 (S103).

Next, the operating unit of the computer 5 calculates an amplitude value of a first order spectrum (fundamental frequency) of the interference fringe obtained in S103 (S104). The "first order spectrum" is a spectrum that is adjacent to the 0-th order spectrum that has a DC component of the interference fringe light intensity among the spatial frequency spectra obtained by performing a two-dimensional Fourier transformation for the interference fringe. When an orthogonal diffraction grating is used, a first order spectrum exists in each of the two orthogonal directions, and one of them is used. Alternatively, a spectrum having a frequency having a first order spectrum (that inclines by 45° relative to the orthogonal grating) in both orthogonal directions may be used. The amplitude value of the first order spectrum means a maximum value in the vicinity of fundamental frequency in the spatial frequency spectrum.

In order to reduce the influence of the noises on the spatial frequency spectrum, an integrated value of the amplitude in a range that does not overlap other orders in a frequency region near the amplitude maximum value may be used as the amplitude value of the first order spectrum. Alternatively, in order to reduce the influences of the time variation of the brightness of the light source and different CCD exposure time periods in obtaining the interference fringe, a normalized value made by dividing an amplitude value of the first order spectrum by the amplitude value of the $0^{th}$ order spectrum may be used as the amplitude value of the first order spectrum. It is therefore sufficient that the amplitude value of the first order spectrum is an amplitude value itself or a value indicative of or corresponding to the amplitude value.

Next, the operating unit of the computer 5 calculates a curve of the first order spectrum from the amplitude values of the first order spectrum calculated in S104 (S105). The curve of the first order spectrum can be obtained by fitting the amplitude values of the first order spectrum obtained in S104 to a function of the position of the image pickup device 4, such as a quadratic function or a Gaussian function.

Next, the operating unit of the computer 5 finds a maximum value of the curve of the first order spectrum calculated by S105 (S106). Finally, the controller of the computer 5 arranges the image pickup device 4 at the position corresponding to the maximum value found in S106 using the moving unit 8.

The flow shown in FIG. 2 is merely illustrative: For example, the image pickup device 4 may be arranged in S101 and the diffraction grating 3 may be arranged in S107. In addition, any orders may be used for S104 and S105 as long as they are selected in the spatial frequency spectra other than the $0^{th}$ order.

FIGS. 3A-3F are graphs each showing a relationship between the position of the image pickup device 4 on the optical axis and the amplitude value (solid line) and the phase value (broken line) of each order component in the spatial frequency spectrum obtained by performing a Fourier transformation for the interference fringe. The abscissa axis denotes a distance (μm) between the diffraction grating 3 and the image pickup device 4, and a distance of 200 μm is designed to provide the Talbot condition. The left ordinate axes in FIGS. 3A to 3F are amplitude values (solid lines) of the first order spectrum to the sixth order spectrum normalized by the $0^{th}$ order spectrum, and the right ordinate axes are phase values (broken lines) of the first order spectrum to the sixth order spectrum normalized by the first order spectrum.

The amplitude value of each order spectrum is an amplitude maximum in a region near the frequency that is the order number multiple of the fundamental frequency in the spatial frequency spectrum. In order to reduce the influence of the noises on the spatial frequency spectrum, an integrated value of the amplitude in a range that does not overlap other orders in the frequency region near the amplitude maximum value may be used as the amplitude value of each order spectrum. In addition, the amplitude value of each order spectrum may be a normalized value made by dividing the amplitude value by the amplitude of the specific order. For example, in a normalization using the $0^{th}$ order spectrum, an effect of reducing the influences of a time variation of the brightness of the light source and different CCD exposure time periods in obtaining the interference fringe. When the low frequency region near the $0^{th}$ order spectrum has noises, normalization using the first order spectrum is effective. In addition, the amplitude value of each order spectrum may be amplitude of a frequency that is the order number multiple of the frequency that provides the amplitude maximum of the first order spectrum. It is therefore sufficient that the amplitude value of each order spectrum may be an amplitude value itself or a value indicative of or corresponding to the amplitude value.

The phase value of each order spectrum means a phase at a frequency indicative of an amplitude maximum of each order in the spatial frequency spectrum or a phase at a frequency that is the order number multiple of the frequency that provides the amplitude maximum of the first order spectrum. In FIGS. 3A-3F, the phase values of the second or higher orders spectra are normalized by the phase value of the first order spectrum and by subtracting s×(phase value of the first order spectrum) from the phase value of each order where "s" denotes an order.

Figure 3A:
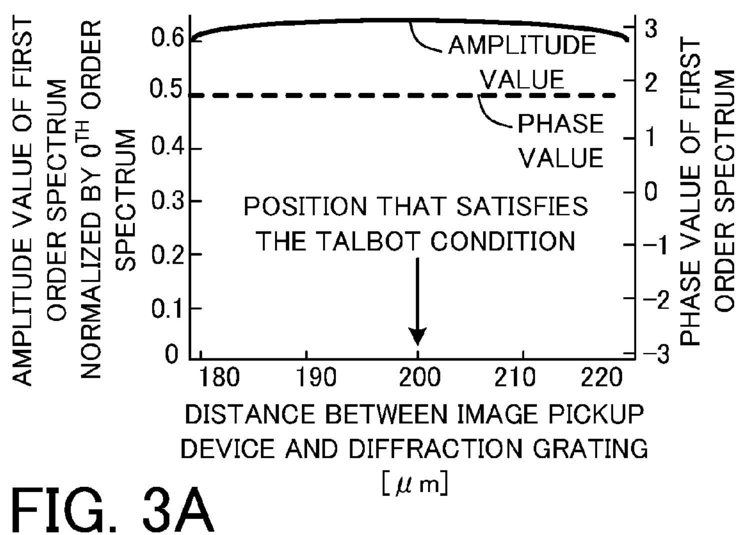
FIGS. 3A-3F are graphs each showing a relationship among an amplitude value (solid line) and a phase value (broken line) of each order component in a spatial frequency spectrum of an interference fringe and a position of an image pickup device on an optical axis.
Figure 3B:
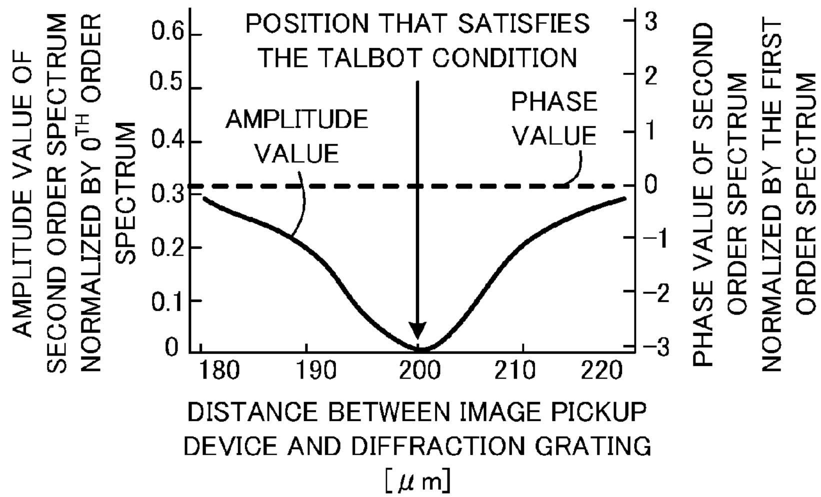
Figure 3C:
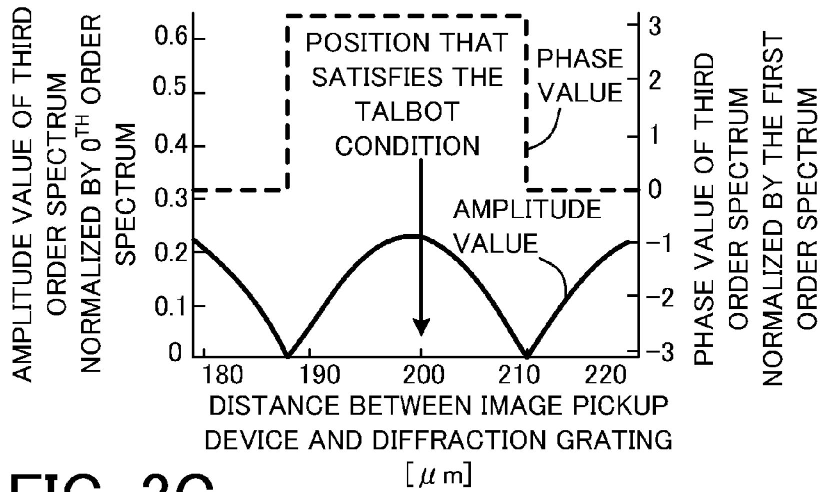
Figure 3D:
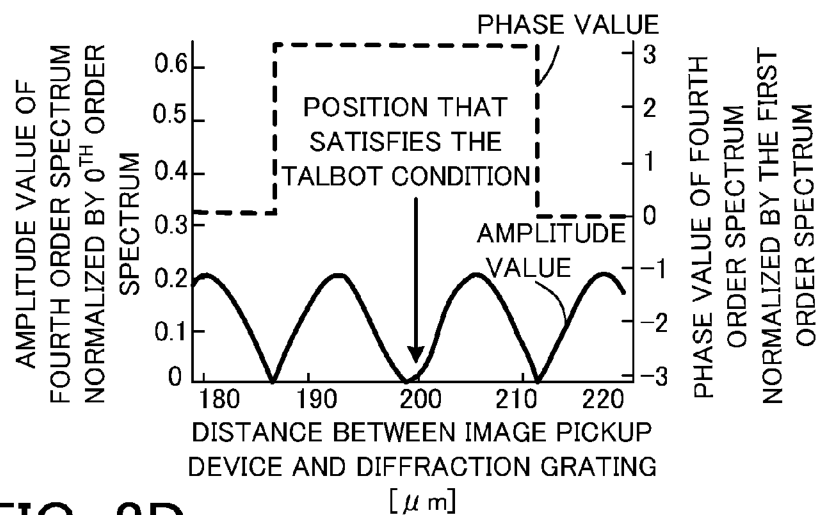
Figure 3E:
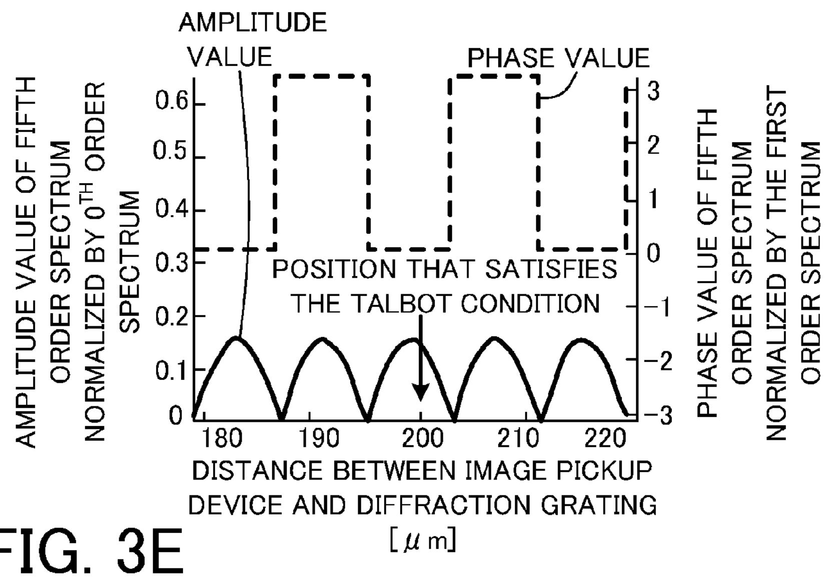

As understood from FIGS. 3A, 3C, and 3E, the amplitude value of the odd order spectrum (which is a frequency that is an odd number multiple of the fundamental frequency) becomes maximum when the Talbot condition is met. Therefore, the positions of the diffraction grating 3 and the image pickup device 4 can be determined in accordance with a procedure similar to that of the first order spectrum shown in FIG. 2.

Figure 3F:
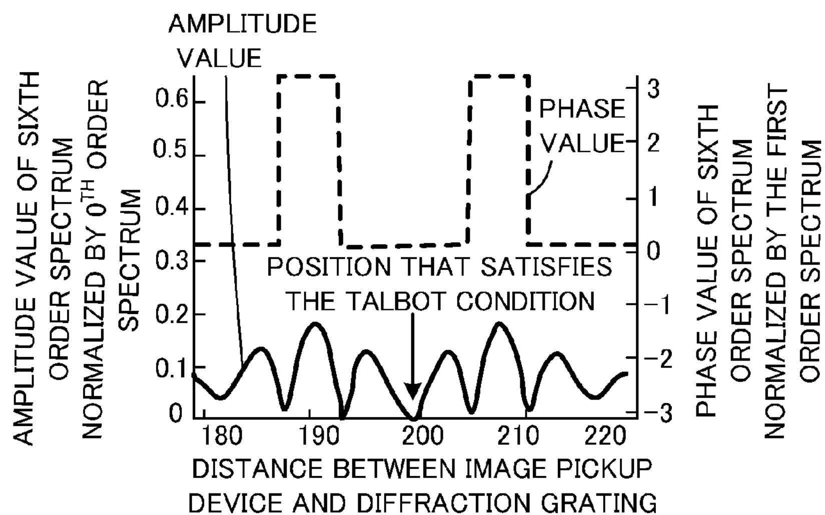

In utilizing the amplitude value of the even order spectrum (which is a frequency that is an even number multiple of the fundamental frequency), as understood from FIGS. 3B, 3D, and 3F, the amplitude value becomes minimum when the Talbot condition is met. Therefore, a position that minimizes the fitting function in S106 in accordance with the procedure shown in FIG. 2 may be found.

The second and higher orders spectra can be used to easily determine the precise positions of the diffraction grating 3 and the image pickup device 4 because an amplitude variation amount relative to the positional change is significant near the position that satisfies the Talbot condition. On the other hand, since the amplitude value of the second and higher orders spectra may provide a maximum or minimum value other than the position that satisfies the Talbot condition, it is necessary to determine whether the amplitude of each order spectrum becomes maximum or minimum near the position that maximizes the amplitude value of the first order spectrum. In other words, after the position that satisfies the Talbot condition using the first order spectrum is roughly recognized, the position that satisfies the Talbot condition is precisely determined using a high order spectrum so that the amplitude value of the first order spectrum is closest to the maximum position.

In a Talbot interferometer that can approximates z or z0 to infinity in the Equation 1 or when a distance between the diffraction grating 3 and the image pickup device 4 is sufficiently large or when the light that has passed the test object L is an almost plane wave, the diffraction grating 3 and the image pickup device 4 can be more precisely positioned.

All odd order spectra in a Talbot interferometer have minimum amplitude values at positions that are distant by a specific distance before and after the Talbot condition satisfying position of the diffraction grating 3 or the image pickup device 4 on the optical axis (or the positions where N in the Equation 2 shifts by the same value of an integer or half integer). At these positions, the phase value of odd order spectra shifts by pi radian. The first order spectrum becomes as it is outside the display range of FIG. 3A.

A phase of an even order spectrum higher than the fourth order shifts by pi radian at a position that is distant by a specified distance before and after the Talbot condition satisfying position of the diffraction grating 3 or the image pickup device 4 on the optical axis (or the position where N in the Equation 2 shifts by the same value of an integer or half integer).

In view of the foregoing natures, the diffraction grating 3 or the image pickup device 4 can be arranged at the position that satisfies the Talbot condition, by finding two amplitude minimum positions or pi-phase shift positions before and after the position that satisfies the Talbot condition. In other words, using a third or higher odd order spectrum or using a fourth or higher even order spectrum, the diffraction grating 3 or the image pickup device 4 is positioned at the midpoint between these two pi-phase shift points.

Figure 4:
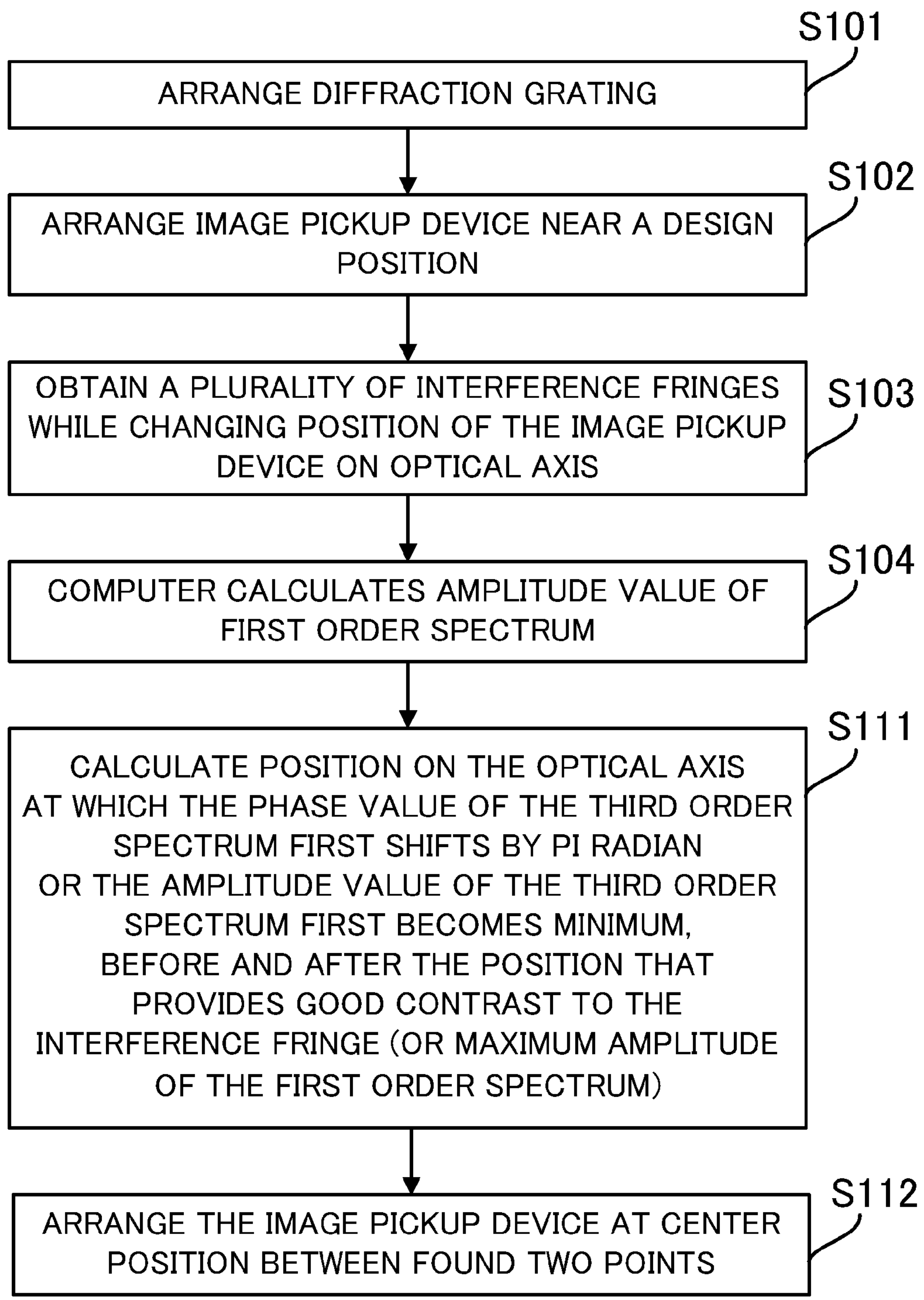
FIG. 4 is a flowchart of another adjustment method of the Talbot interferometer shown in FIG. 1.

FIG. 4 is a flowchart showing an adjustment method of the Talbot interferometer when the third order spectrum is utilized. S101 to S104 are similar to those of FIG. 2. In FIG. 4, after S104, before and after the position that provides almost maximum amplitude of the first order spectrum, the operating unit of the computer 5 finds the position at which the phase value of the third order spectrum first inverts (shifts by pi radian) or the amplitude value of the third order spectrum first becomes minimum (S111). Next, the controller of the computer 5 moves the image pickup device 4 to the center position between these two points found by S111 using the moving unit 8 (S112).

Near the position that provides the minimum value of the third order spectrum before and after the position that satisfies the Talbot condition, the amplitude value linearly changes with the position of the image pickup device 4 and the phase value shifts by pi radian at the position that provides the minimum amplitude value.

Figure 5:
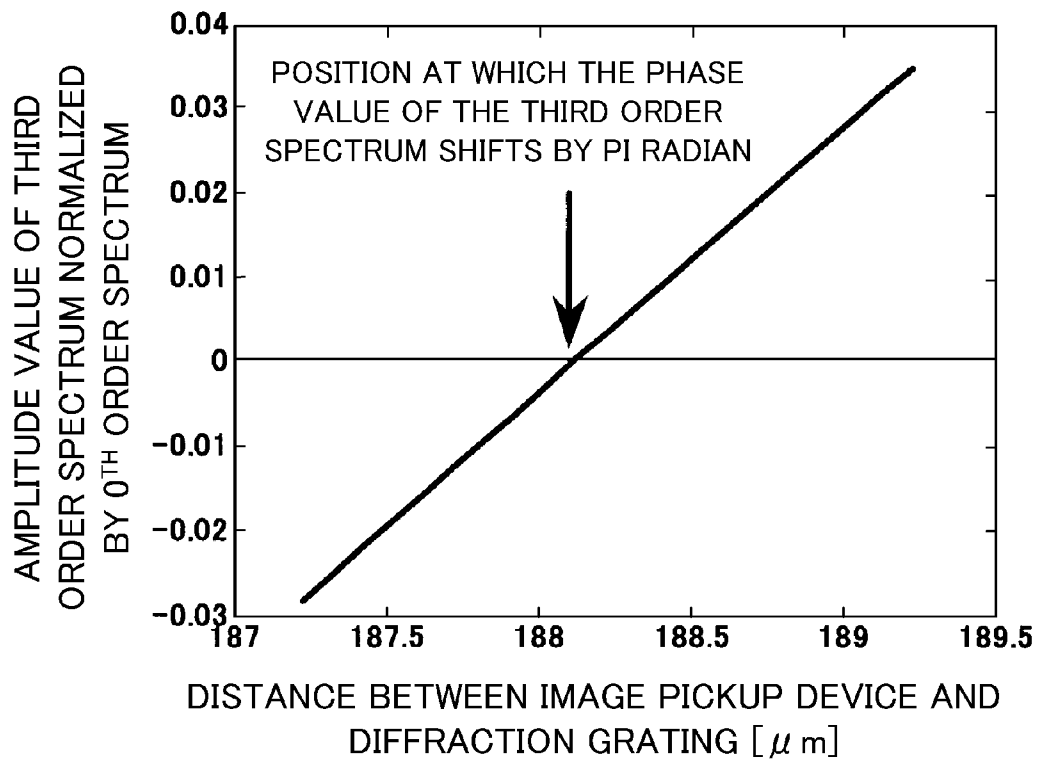
FIG. 5 is a graph showing a relationship between an amplitude value of a third order spectrum and a position of an image pickup device of FIG. 3E.

FIG. 5 is a graph showing a relationship between the amplitude value of the third order spectrum provided with a plus or minus sign due to pi-phase shift and the position of the image pickup device 4. The positioning precision of the diffraction grating 3 or the image pickup device 4 becomes higher in utilizing the linear amplitude value variation or pi-phase shifts in FIG. 5 than detecting the position that provides the maximum amplitude value using FIG. 3A.

A distance between the position that satisfies the Talbot condition and the position which provides the minimum amplitude value or pi-phase shift before and after the position that satisfies the Talbot condition is less sensitive to the transmission wavefront and the noises. Therefore, once the positions of these two points are found, the image pickup device 4 can be positioned from one of the two points by setting to a moving amount a distance that halves the distance between these two points. Nevertheless, this is not true when the diffraction grating 3 is replaced or the structure of the illumination optical system 2 is changed.

Although FIG. 4 utilizes the third order spectrum, an odd order spectrum other than the third order may be used. An even order spectrum higher than the fourth order may also be used to arrange the diffraction grating 3 or the image pickup device 4 in the same procedure as that of FIG. 4, but this method utilizes only the position that pi-phase shift occurs before and after the position that satisfies the Talbot condition and does not utilize the position that minimizes the amplitude. This is because the even order spectrum provides a minimum amplitude value at the position that satisfies the Talbot condition.

After the diffraction grating 3 or the image pickup device 4 is positioned, the image pickup device 4 captures the interference fringe. The operating unit of the computer 5 calculates the wavefront that has passed the test object L from the interference fringe obtained in S103. A wavefront gradient in the periodical direction of the first order spectrum can be calculated by cutting out the first order spectrum (in a region near the fundamental frequency) from the spatial frequency spectrum of the interference fringe, by moving it to the origin in the spatial frequency domain, and by performing the inverse Fourier transformation. The wavefront is obtained by calculating wavefront gradients in the two orthogonal directions, and by fitting these wavefront gradients to a wavefront that simultaneously satisfies themusing a sequence of functions such as the Zernike polynomials.

In a variation of this embodiment, the first order spectra are obtained by capturing a plurality of interference fringes at a plurality of discrete positions by changing the distance between the diffraction grating 3 and the image pickup device 4, and a wavefront may be calculated based on an interference fringe having a maximum amplitude value of the first order spectrum. This variation of this embodiment provides similar effects without precisely positioning one of them at the position that satisfies the Talbot condition by making higher the resolution of the image pickup position.

Second Embodiment

Figure 6:
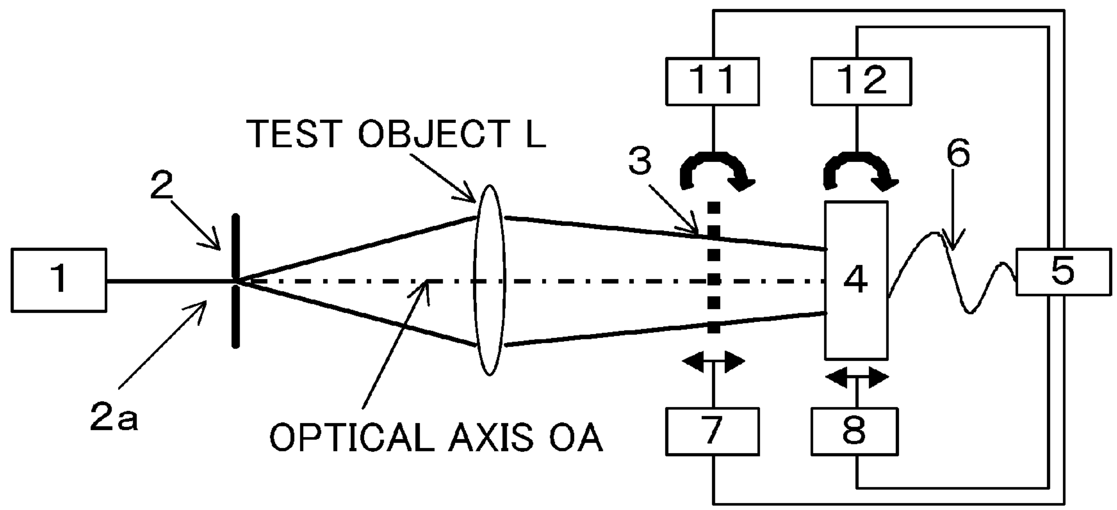
FIG. 6 an optical path diagram of a Talbot interferometer according to a second embodiment.

FIG. 6 is an optical path diagram of the Talbot interferometer according to a second embodiment, which is different from the first embodiment in that the second embodiment has orientation adjusters 11 and 12. The orientation adjuster 11 changes an angle between the normal of the diffraction grating 3 and the optical axis OA, and the orientation adjuster 12 changes an angle between the normal of the image pickup device 4 and the optical axis OA. The controller of the computer 5 controls operations of the orientation adjusters 11 and 12 based on information stored in the memory.

Figure 7:
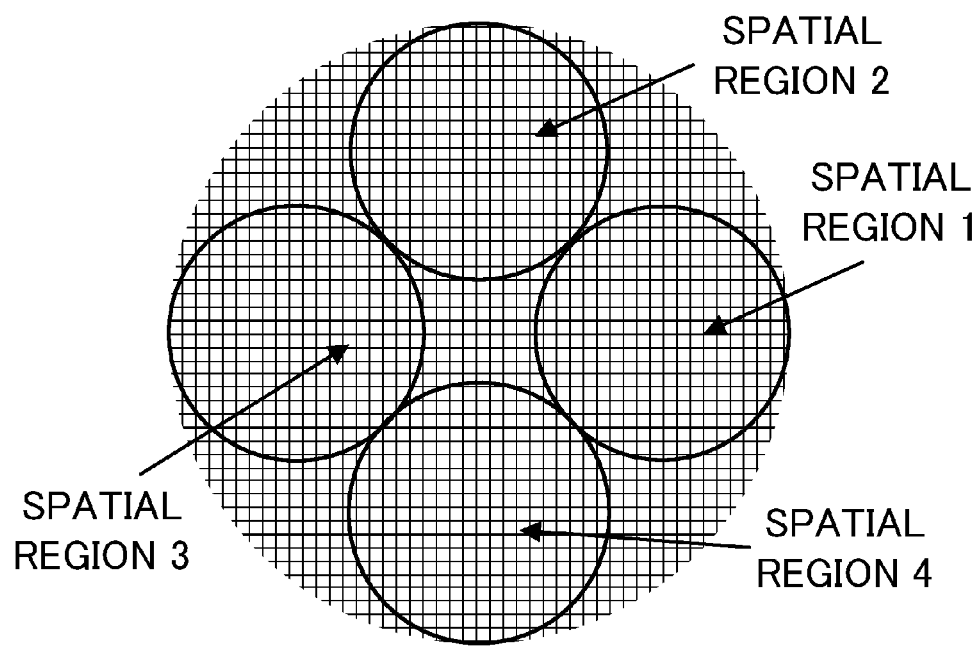
FIG. 7 is a schematic view for explaining an orientation adjustment method of FIG. 6.

This embodiment divides the plurality of interference fringes that are captured by changing the position of the diffraction grating 3 or the image pickup device 4 on the optical axis OA, into at least three spatial regions, and obtains these spatial frequency spectra. FIG. 7 shows an example in which the interference fringe is divided into four spatial regions. In each spatial region, a position of the diffraction grating 3 or the image pickup device 4 on the optical axis OA to be adjusted is found in accordance with the procedure of FIG. 2 or FIG. 4.

When the normal of the image pickup device 4 or the optical axis OA shifts from the normal of the diffraction grating 3, the adjusted position of the diffraction grating 3 or the image pickup device 4 found for each spatial region do not accord with each other. In this case, no matter how the position of the diffraction grating 3 or the image pickup device 4 is changed, no Talbot condition is available in all the divided spatial regions, and the measurement wavefront of a certain spatial region contains an error caused by the contrast deterioration. In order to reduce this error, the orientation of the diffraction grating 3 or the image pickup device 4 is adjusted using the orientation adjusters 11 and 12 so that a deviation from the Talbot condition can lessen in the divided spatial regions.

In the orientation adjustment, as shown in FIG. 7, the interference fringe is divided and adjusted positions $z1$ to $z4$ of the image pickup device 4 are found in accordance with the procedure of FIG. 2 or FIG. 3. Next, the image pickup device 4 is moved to an average value (center) of the calculated adjusted positions (or $(z1+z2+z3+z4)/4$ using the moving unit 8. Where Lx is a distance between the center of the spatial region 1 and the center of the spatial region 3 in the image pickup device 4 after the movement, an angle between the normal of the image pickup device 4 and the optical axis OX is adjusted by $(z1-z3)/Lx$ in the plane formed by the optical axis and the line that connects the center of the spatial region 1 to the center of the spatial region 3. Similarly, where Ly is a distance between the center of the spatial region 2 and the center of the spatial region 4, an angle between the normal of the image pickup device 4 and the optical axis OX is changed by $(z2-z4)/Ly$ in the plane formed by the optical axis and the line that connects the center of the spatial region 2 to the center of the spatial region 4. Thus, the computer 5 adjusts the orientation of one of the diffraction grating 3 and the image pickup device 4 using the orientation adjuster 11 or 12 by an angle that is made by dividing a difference of the adjusted position of the one of the diffraction grating 3 and the image pickup device 4 corresponding to the two out of at least three spatial regions by a distance between the centers of the two spatial regions. An angular variation amount is a value that is set on the assumption that Lx and Ly are sufficiently larger than z1−z3 and z2−z4. The orientation of the diffraction grating 3 can be adjusted in accordance with the same procedure even when a plurality of interference fringes is captured by moving the diffraction grating 3.

Third Embodiment

Figure 8:
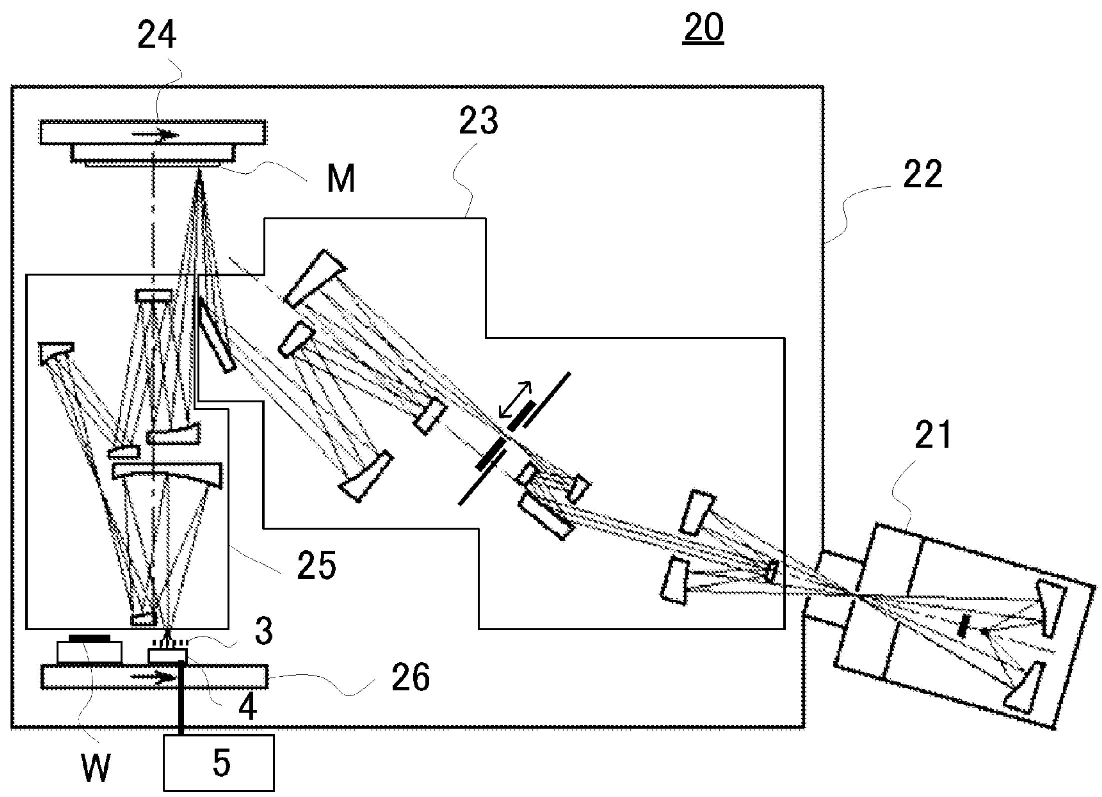
FIG. 8 is a block diagram of an exposure apparatus having the Talbot interferometer.

FIG. 8 is a block diagram of an exposure apparatus 20 that includes a Talbot interferometer.

The exposure apparatus 20 is a projection exposure apparatus configured to expose a pattern of an original onto a substrate, and includes a light source section 21 and a vacuum chamber 22. The vacuum chamber 22 accommodates an illumination optical system 23, an original stage 24, a projection optical system 25, a substrate stage 26, and a part of a Talbot interferometer.

The light source section 21 is a light source configured to irradiate EUV light having a wavelength of about 13.5 nm, and the major optical system is housed in the vacuum chamber 22 because the EUV light has a low transmittance to air. The illumination optical system 23 is an optical system configured to propagate the EUV light and to illuminate an original (mask or reticle) M, and serves as an illumination optical system 2 in the Talbot interferometer. A pinhole plate is provided near the original M.

The original M is catoptric, and has a pattern to be transferred. The original M is supported and driven by the original stage 24. The projection optical system 25 is a catoptric optical system configured to project an image of the pattern of the original M onto the substrate W, and to maintain the original M and the substrate W optically conjugate with each other. The projection optical system 25 is the test object L whose wavefront is to be measured by the Talbot interferometer, and the test object L may not be a dioptric optical system as in this embodiment. A photosensitive agent is applied onto the substrate W, and the substrate W is supported and driven by the substrate stage 26.

The Talbot interferometer measures a transmission wavefront of the projection optical system 25. The diffraction grating 3 and the image pickup device 4 of the Talbot interferometer are installed to the substrate stage 26 but may be arranged on an independent measurement stage. Each of the diffraction grating 3 and the image pickup device 4 can be moved in the optical axis direction of the projection optical system 25 by a moving unit (not shown) provided on the substrate stage 26.

In exposure, the light from the light source section 21 illuminates the original M via the illumination optical system 23. The diffracted light from the original M is projected onto the substrate W via the projection optical system 25. When the exposure apparatus 20 is provided with the Talbot interferometer and measures the wavefront of the light that has passed the projection optical system 25, the wavefront aberration and its variation with time of the projection optical system 25 can be corrected. Thus, the exposure precision can improves.

A device (such as a semiconductor integrated circuit device and a liquid crystal display device) is manufactured by exposing a photosensitive agent applied substrate (such as a wafer and a glass plate) using the exposure apparatus, and by developing the substrate, and other known steps (device manufacturing method).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The Talbot interferometer is applicable to a measurement of a wavefront of a test object. The exposure apparatus is applicable to an application of manufacturing a device.

This application claims the benefit of Japanese Patent Application No. 2009-103777, filed Apr. 22, 2009, which is hereby incorporated by reference herein in its entirety.

What is claimed is:

1. A Talbot interferometer configured to measure a wavefront of light that has passed a test object, said Talbot interferometer comprising:

a diffraction grating configured to divide the light that has passed the test object into a plurality of diffracted light fluxes;

an image pickup device configured to capture an interference fringe formed by the plurality of diffracted light fluxes;

a moving unit configured to move at least one of the diffraction grating and the image pickup device; and a controller configured to control the image pickup device and the moving unit, wherein the controller captures a plurality of interference fringes using the image pickup device while changing a distance between the diffraction grating and the image pickup device using the moving unit, obtains a spatial frequency spectrum of each of the plurality of interference fringes, selects one of the plurality of interference fringes based on amplitude values of a plurality of spatial frequency spectra, and obtains a wavefront of the light that has passed the test object, based on a selected interference fringe.

2. A method for measuring a wavefront of light that has passed a test object using a Talbot interferometer that includes an illumination optical system configured to illuminate the test object using the light from a light source, a diffraction grating configured to divide the light that has passed the test object into a plurality of diffracted light fluxes, and an image pickup device configured to capture an interference fringe formed by the plurality of diffracted light fluxes, said method comprising the steps of:

changing a distance between the diffraction grating and the image pickup device and capturing a plurality of interference fringes using the image pickup device;

obtaining a spatial frequency spectrum of each of the plurality of interference fringes;

selecting one of the plurality of interference fringes based on amplitude values of a plurality of spatial frequency spectra; and obtaining a wavefront of the light that has passed the test object, based on a selected interference fringe.

* * * * *